(12) United States Patent
Obeshaw

(10) Patent No.: US 6,949,282 B2
(45) Date of Patent: Sep. 27, 2005

(54) CONTOURED CRUSHABLE COMPOSITE STRUCTURAL MEMBERS AND METHODS FOR MAKING THE SAME

(75) Inventor: Dale Francis Obeshaw, Salt Lake City, UT (US)

(73) Assignee: Delphi Technologies, Inc., Troy, MI (US)

( * ) Notice: Subject to any disclaimer, the term of this patent is extended or adjusted under 35 U.S.C. 154(b) by 220 days.

(21) Appl. No.: 09/809,778

(22) Filed: Mar. 16, 2001

(65) Prior Publication Data

US 2002/0011047 A1 Jan. 31, 2002

Related U.S. Application Data

(60) Provisional application No. 60/216,636, filed on Jul. 7, 2000.

(51) Int. Cl.[7] .............................. B65D 1/00; B32B 1/08; F16L 1/00
(52) U.S. Cl. .................... 428/131; 428/36.1; 428/36.91; 428/116; 428/134; 428/136; 138/119; 52/783.11; 52/783.17; 52/794.1
(58) Field of Search ................................. 428/131, 134, 428/136, 36.91, 36.1, 116; 138/119; 293/132, 133; 296/189; 52/783.11, 783.17, 794.1

(56) References Cited

U.S. PATENT DOCUMENTS

| | | |
|---|---|---|
| 1,677,714 A | 7/1928 | Frease |
| 1,930,285 A | 10/1933 | Robinson .................... 113/116 |
| 2,423,870 A | 7/1947 | Blessing ..................... 154/129 |
| 3,332,446 A | 7/1967 | Mann .......................... 138/114 |
| 3,489,052 A | 1/1970 | Colyer et al. ................. 84/422 |
| 3,553,978 A | 1/1971 | Williams |
| 3,592,884 A | 7/1971 | Williams ...................... 264/45 |
| 3,622,437 A | 11/1971 | Hobaica et al. ............. 161/168 |
| 3,638,455 A | 2/1972 | Francois ........................ 64/23 |
| 3,651,661 A | 3/1972 | Darrow |
| 3,989,562 A | 11/1976 | Hladik et al. .................. 156/79 |
| 4,013,810 A | 3/1977 | Long ........................... 428/308 |
| 4,025,675 A * | 5/1977 | Jonda ........................ 428/36.2 |
| 4,089,190 A | 5/1978 | Worgan et al. ............... 64/1 S |
| 4,128,963 A | 12/1978 | Dano ........................ 264/46.6 |
| 4,135,019 A | 1/1979 | Kourtides et al. .......... 428/117 |
| 4,161,231 A | 7/1979 | Wilkinson ................... 181/292 |
| 4,171,626 A | 10/1979 | Yates et al. ................... 64/1 S |
| 4,178,713 A | 12/1979 | Higuchi .................... 43/18 GF |
| 4,185,472 A | 1/1980 | Yates et al. .................... 64/1 S |
| 4,212,693 A | 7/1980 | Saito et al. ................. 156/173 |
| 4,236,386 A | 12/1980 | Yates et al. .................... 64/1 S |
| 4,238,539 A | 12/1980 | Yates et al. ................... 428/36 |
| 4,238,540 A | 12/1980 | Yates et al. ................... 428/36 |
| 4,248,062 A | 2/1981 | McLain et al. ............... 64/1 S |
| 4,259,382 A | 3/1981 | Schwan ........................ 428/36 |
| 4,265,951 A | 5/1981 | Yates et al. ................... 428/36 |
| 4,279,275 A | 7/1981 | Stanwood et al. .......... 138/109 |
| 4,291,205 A | 9/1981 | Kamon et al. .......... 179/181 R |
| 4,325,174 A | 4/1982 | Smith et al. .................. 29/434 |
| 4,355,061 A | 10/1982 | Zeigler ........................ 428/36 |

(Continued)

FOREIGN PATENT DOCUMENTS

| | | | |
|---|---|---|---|
| EP | 908300 A2 * | 4/1999 | ............. B32B/5/28 |
| GB | 2323146 A * | 9/1998 | |

*Primary Examiner*—Elena Tsoy
(74) *Attorney, Agent, or Firm*—Michael D. Smith

(57) ABSTRACT

The present invention provides contoured crushable composite structural members and methods for making the same. The contoured structural members comprise composite materials sandwiching a support or stabilizing structure. The contoured structure can be provided by tube rolling (or roll wrapping) the composite materials and the support structure together and then, if necessary, bonding them or connecting them. The structural members are made crushable by incorporating an initiator into the structures of the members. With a contoured, crushable, and generally non-flat structure, applications for the structural members of the present invention are nearly limitless.

35 Claims, 9 Drawing Sheets

U.S. PATENT DOCUMENTS

| | | | |
|---|---|---|---|
| 4,358,284 A | 11/1982 | Federmann et al. ......... 464/181 |
| 4,380,443 A | 4/1983 | Federmann et al. ......... 464/181 |
| 4,385,952 A | 5/1983 | Futakuchi et al. .......... 156/174 |
| 4,421,497 A | 12/1983 | Federmann et al. ......... 464/181 |
| 4,531,619 A | 7/1985 | Eckels ........................ 188/371 |
| 4,540,385 A | 9/1985 | Krude ......................... 464/113 |
| 4,551,116 A | 11/1985 | Krude ........................... 464/97 |
| 4,556,400 A | 12/1985 | Krude et al. ................. 464/181 |
| 4,573,707 A | 3/1986 | Pabst ........................... 280/792 |
| 4,600,619 A | 7/1986 | Chee et al. ................... 428/118 |
| 4,605,385 A | 8/1986 | Puck et al. ................... 464/181 |
| 4,663,819 A | 5/1987 | Traylor ........................ 29/432 |
| 4,664,644 A | 5/1987 | Kumata et al. .............. 464/180 |
| 4,681,556 A | 7/1987 | Palmer ........................ 464/181 |
| 4,706,364 A | 11/1987 | Aubry .......................... 29/458 |
| 4,722,717 A | 2/1988 | Salsman et al. ............. 464/181 |
| 4,742,899 A | 5/1988 | Thornton ..................... 188/377 |
| 4,773,891 A | 9/1988 | Hoffmann .................... 464/181 |
| 4,803,108 A | 2/1989 | Leuchten et al. ............ 428/118 |
| 4,838,833 A | 6/1989 | Coursin ....................... 464/181 |
| 4,859,517 A | 8/1989 | Hull ............................. 428/116 |
| 4,861,649 A | 8/1989 | Browne ........................ 428/240 |
| 4,885,865 A | 12/1989 | Rumbaugh ................... 43/18.5 |
| 4,892,433 A | 1/1990 | Schreiber ..................... 403/359 |
| 4,946,721 A | 8/1990 | Kindervater et al. ....... 428/36.1 |
| 4,952,195 A | 8/1990 | Traylor ........................ 464/181 |
| 4,968,545 A | 11/1990 | Fellman et al. ............. 428/36.1 |
| 5,006,391 A | 4/1991 | Biersach ...................... 428/116 |
| 5,043,217 A | 8/1991 | Peters et al. ................. 428/397 |
| 5,061,533 A | 10/1991 | Gomi et al. .................. 428/36.3 |
| 5,062,914 A | 11/1991 | Fuchs et al. ................. 156/172 |
| 5,085,467 A | 2/1992 | Converse ..................... 280/777 |
| 5,087,491 A | 2/1992 | Barrett ........................ 428/34.5 |
| 5,102,723 A | 4/1992 | Pepin .......................... 428/223 |
| 5,127,975 A | 7/1992 | Zackrisson et al. .......... 156/171 |
| 5,131,970 A * | 7/1992 | Potter et al. ................. 156/205 |
| 5,139,281 A | 8/1992 | Dzioba ........................ 280/775 |
| 5,140,913 A | 8/1992 | Takeichi et al. ............. 105/397 |
| 5,156,977 A | 10/1992 | Dynes et al. ................. 428/40 |
| 5,192,384 A | 3/1993 | Barrier et al. ............... 156/189 |
| 5,192,623 A | 3/1993 | Gewelber .................... 428/593 |
| 5,195,779 A | 3/1993 | Aoyama et al. ............. 280/784 |
| 5,225,016 A | 7/1993 | Sarh ............................ 156/156 |
| 5,236,529 A | 8/1993 | Ferrier et al. ................ 156/171 |
| 5,239,888 A | 8/1993 | Sevault et al. ............... 74/492 |
| 5,250,132 A | 10/1993 | Lapp et al. ................... 156/173 |
| 5,256,969 A | 10/1993 | Miyajima et al. ............ 324/322 |
| 5,261,616 A | 11/1993 | Crane et al. ................. 242/7.22 |
| 5,261,991 A | 11/1993 | Zackrisson et al. .......... 156/294 |
| 5,302,428 A | 4/1994 | Steele et al. ................. 428/34.9 |
| 5,306,371 A | 4/1994 | Ramey ........................ 156/171 |
| 5,309,620 A | 5/1994 | Shinohars .................... 29/432 |
| 5,313,987 A | 5/1994 | Rober et al. ................. 138/137 |
| 5,320,579 A | 6/1994 | Hoffmann .................... 464/181 |
| 5,332,606 A | 7/1994 | Pearce ......................... 428/36.3 |
| 5,342,465 A | 8/1994 | Bronowicki et al. ........ 156/175 |
| 5,344,038 A | 9/1994 | Freeman et al. ............. 220/453 |
| 5,348,052 A | 9/1994 | Crane et al. ................. 138/174 |
| 5,363,717 A | 11/1994 | Eichholz et al. ............. 74/493 |
| 5,370,417 A | 12/1994 | Kelman et al. ............... 280/751 |
| 5,397,272 A | 3/1995 | Smilery et al. .............. 464/181 |
| 5,419,416 A | 5/1995 | Miyashita et al. ........... 188/371 |
| 5,423,722 A | 6/1995 | Beauch et al. ............... 464/151 |
| 5,436,080 A | 7/1995 | Inoue et al. .................. 428/546 |
| 5,437,450 A | 8/1995 | Akatsuka et al. ........... 273/80 B |
| 5,447,765 A | 9/1995 | Crane ........................... 428/36.9 |
| 5,449,024 A | 9/1995 | Rober et al. ................. 138/137 |
| RE35,081 E | 11/1995 | Quigley ....................... 428/36.2 |
| 5,484,498 A | 1/1996 | Hogarth et al. .............. 156/189 |
| 5,499,661 A | 3/1996 | Odru et al. ................... 138/124 |
| 5,503,431 A | 4/1996 | Yamamoto ................... 280/777 |
| 5,507,477 A | 4/1996 | Manning et al. .......... 267/140.3 |
| 5,537,789 A | 7/1996 | Minke et al. ................. 52/313 |
| 5,538,282 A | 7/1996 | White et al. ................. 280/779 |
| 5,540,877 A | 7/1996 | Repetto et al. .............. 264/513 |
| 5,562,981 A | 10/1996 | Ehrlich ........................ 428/325 |
| 5,567,499 A | 10/1996 | Cundiff et al. ............... 428/116 |
| 5,569,508 A | 10/1996 | Cundiff ........................ 428/117 |
| 5,571,207 A | 11/1996 | Houser ......................... 623/27 |
| 5,579,809 A | 12/1996 | Millward et al. ............ 138/174 |
| 5,590,565 A | 1/1997 | Palfenier et al. .............. 74/493 |
| 5,600,912 A | 2/1997 | Smith ......................... 42/76.01 |
| 5,601,892 A | 2/1997 | McIntosh .................... 428/35.8 |
| 5,624,115 A | 4/1997 | Baum .......................... 473/567 |
| 5,624,519 A | 4/1997 | Nelson et al. ............... 156/245 |
| 5,632,940 A | 5/1997 | Whatley ..................... 264/46.4 |
| 5,635,306 A | 6/1997 | Minamida et al. .......... 428/593 |
| 5,645,668 A | 7/1997 | Lin et al. ..................... 156/175 |
| 5,652,039 A | 7/1997 | Tremain et al. ............. 428/121 |
| 5,655,975 A | 8/1997 | Nashif ......................... 473/316 |
| 5,660,901 A | 8/1997 | Wong .......................... 428/35.7 |
| 5,662,293 A * | 9/1997 | Hower et al. ................. 244/133 |
| 5,669,718 A | 9/1997 | Sakairi et al. ............... 384/220 |
| 5,676,216 A | 10/1997 | Palma et al. .................. 180/90 |
| 5,678,454 A | 10/1997 | Cartwright et al. ........... 74/493 |
| 5,688,571 A | 11/1997 | Quigley et al. ............. 428/36.1 |
| 5,690,035 A | 11/1997 | Hatayama et al. ........... 105/452 |
| 5,697,667 A | 12/1997 | Beaudet et al. .............. 296/189 |
| 5,698,055 A | 12/1997 | Benkoczy .................... 156/149 |
| 5,718,212 A | 2/1998 | Allshouse et al. ........... 124/25.6 |
| 5,725,920 A | 3/1998 | Friedrich et al. ............ 428/34.7 |
| 5,732,801 A | 3/1998 | Gertz ........................... 188/377 |
| 5,753,113 A | 5/1998 | Hendricks ................... 210/169 |
| 5,755,558 A | 5/1998 | Reinforced et al. .......... 416/230 |
| 5,755,826 A | 5/1998 | Beach et al. ................. 473/316 |
| 5,773,121 A | 6/1998 | Meteer et al. ................ 428/117 |
| 5,780,075 A | 7/1998 | Huvey .......................... 425/403 |
| 5,785,931 A | 7/1998 | Maus et al. .................. 422/180 |
| 5,788,278 A | 8/1998 | Thomas et al. .............. 280/777 |
| 5,795,524 A | 8/1998 | Basso et al. .................. 264/221 |
| 5,795,536 A | 8/1998 | Gaworowski et al. ....... 264/571 |
| 5,817,203 A | 10/1998 | Moser .......................... 156/155 |
| 5,820,835 A | 10/1998 | Sheller et al. ................ 422/180 |
| 5,833,782 A * | 11/1998 | Crane et al. ................... 156/60 |
| 5,834,082 A | 11/1998 | Day .............................. 428/56 |
| 5,840,347 A | 11/1998 | Muramatsu et al. ......... 425/393 |
| 5,848,767 A | 12/1998 | Cappa et al. .............. 244/158 R |
| 5,849,122 A | 12/1998 | Kenmochi et al. ........... 156/182 |
| 5,851,336 A | 12/1998 | Cundiff et al. ............. 156/272.2 |
| 5,865,864 A | 2/1999 | Bruck ............................ 55/482 |
| 5,875,596 A | 3/1999 | Muller .......................... 52/239 |
| 5,875,609 A | 3/1999 | Quinif ....................... 52/784.14 |
| 5,875,686 A | 3/1999 | Kinoshita et al. ............. 74/492 |
| 5,876,654 A | 3/1999 | Blonigen et al. ............. 264/316 |
| 5,888,601 A | 3/1999 | Quigley et al. ............. 428/36.1 |
| 5,888,642 A | 3/1999 | Meteer et al. ............. 428/313.5 |
| 5,894,045 A | 4/1999 | Desrondiers ................. 428/178 |
| 5,895,699 A | 4/1999 | Corbett et al. ............... 428/116 |
| 5,899,037 A | 5/1999 | Josey ............................ 52/267 |
| 5,900,194 A | 5/1999 | Ashton ......................... 264/39 |
| RE36,240 E | 6/1999 | Minke et al. ................. 52/313 |
| 5,911,438 A | 6/1999 | Anspaugh et al. ........... 280/777 |
| 5,914,163 A | 6/1999 | Browne ...................... 428/36.1 |
| 5,934,338 A | 8/1999 | Perstnev et al. ............. 138/149 |
| 5,938,274 A | 8/1999 | Ehrlich ........................ 296/191 |
| 5,944,060 A | 8/1999 | MacKay ...................... 138/140 |
| 5,944,124 A | 8/1999 | Pomerleau et al. .......... 175/320 |
| 5,945,643 A | 8/1999 | Casser ......................... 181/290 |
| 5,961,245 A | 10/1999 | Garin et al. ............... 403/322.1 |
| 5,964,536 A | 10/1999 | Kinoshita .................... 384/441 |
| 5,975,766 A | 11/1999 | Cau ............................. 384/538 |

| | | | |
|---|---|---|---|
| 6,062,632 A * | 5/2000 | Brachos et al. | 296/189 |
| 6,116,290 A | 9/2000 | Ohrn et al. | 138/149 |
| 6,227,252 B1 | 5/2001 | Logan | 138/172 |
| 6,308,809 B1 * | 10/2001 | Reid et al. | 188/377 |

* cited by examiner

CONTOURED CRUSHABLE COMPOSITE STRUCTURAL MEMBERS AND METHODS FOR MAKING THE SAME

REFERENCES TO RELATED APPLICATIONS

This application claims priority from U.S. provisional patent application No. 60/216,636, Jul. 7, 2000 the entire disclosure of which is incorporated herein by reference.

FIELD OF THE INVENTION

The present invention relates to structural members and methods for making the same. In particular, the present invention relates to cored composite crushable contoured parts and methods for making the same.

BACKGROUND OF THE INVENTION

In recent years there has been an increasing emphasis on the use of lightweight composite materials. One application, for example, has been their use to improve the efficiency of motor vehicles. To that end, the United States Government and the U.S. Council for Automotive Research (USCAR)—which represents Daimler Chrysler, Ford, and General Motors have partnered to form the Partnership for a New Generation of Vehicles (PNGV). One goal of PNGV is to develop technology, such as composite technology, that can be used to create environmentally friendly vehicles with up to triple the fuel efficiency, while providing today's affordability, performance and safety. For example, PNGV wants to improve the fuel efficiency of today's vehicles from about 28 miles per gallon (mpg) to about 83 mpg and a 40–60% decrease in the present curb weight (3200 pounds).

One method to improve the fuel efficiency is to decrease the weight of today's vehicles and use lighter weight materials. The materials used in today's vehicles, such as steel and aluminum, are quite heavy relative to composite materials, but have been necessary to provide sufficient structural properties, including tensile, compression, flexural, interlaminar shear, and in-plane shear strengths and other mechanical and material properties, to meet vehicle design requirements.

Many other applications of lightweight composites have been made to supplement or replace the use of structural materials, such as steel, cast iron, and aluminum. These include buildings, bridges, recreational vehicles, aerospace, defense, and sporting goods, as well as many other applications.

Composites are a mixture or combination, on a macro scale, of two or more materials that are solid in the finished state, are mutually insoluble, and differ in chemical nature. Types of composites include laminar, particle, fiber, flake, and filled composites. Composites, however, often have not had the combination of structural properties mentioned above and/or low cost necessary to promote their widespread use in motor vehicle and other applications.

Despite their lack of structural strength, some composite materials have been employed in vehicle manufacturing. For example, laminated composite tubes above have been used as structural members in vehicles to reduce the weight and increase the energy absorbing characteristics. Typically, the tube is generally straight over its length and resists axial impacts at the end of the tube by absorbing the energy of the axial impact and crushing at that location. Known means for energy absorption by crushing in composite tubes, include knife-edges, slits, bevels and plugs, and the like at the end of the tube as described in U.S. Pat. Nos. 4,742,899, 5,732,801, and 5,914,163, the disclosures of which are incorporated herein by reference. The crushing characteristics, however, of such composite materials are still fairly limited when compared to more traditional structural materials. For example, such energy absorption means do not exhibit the desired progressive crush beginning at any selected location other than the end of the tube.

One way to increase the structural properties of composite materials, particularly the torsional or flexural strength, is to make them in a more structurally efficient form. In one more structurally efficient form, composite materials have been combined with a supporting structure, such as a honeycomb or foam structure, by sandwiching the supporting structure between panels of the composite material. Examples of such combinations have been described in U.S. Pat. Nos. 5,006,391, 5,195,779, 5,652,039, 5,834,082, 5,848,767, 5,849,122, and 5,875,609, the disclosures of which are incorporated herein by reference. Such combinations, however, have been generally limited to relatively flat structures and so the use of such materials have been quite limited.

SUMMARY OF THE INVENTION

The present invention provides contoured crushable composite structural members and methods for making the same. The contoured structural members comprise composite materials sandwiching a support or stabilizing structure. The contoured structure can be provided by tube rolling (or roll wrapping) the composite materials and the support structure together and then, if necessary, bonding them or connecting them. With a contoured, crushable, and generally non-flat structure, applications for the structural members of the present invention are nearly limitless. The structural members are made crushable by incorporating an initiator into the structural members. The structural member crushes at the location of the initiator by absorbing the energy of an exerting load.

BRIEF DESCRIPTION OF THE DRAWINGS

FIGS. 1–15 presented in conjunction with this description are views of only particular—rather than complete—portions of the structural members and methods of making the same.

DETAILED DESCRIPTION OF THE INVENTION

The following description provides specific details in order to provide a thorough understanding of the present invention. The skilled artisan, however, would understand that the present invention can be practiced without employing these specific details. Indeed, the present invention can be practiced by modifying the illustrated structural member and method and can be used in conjunction with apparatus and techniques conventionally used in the industry.

Figure 1:
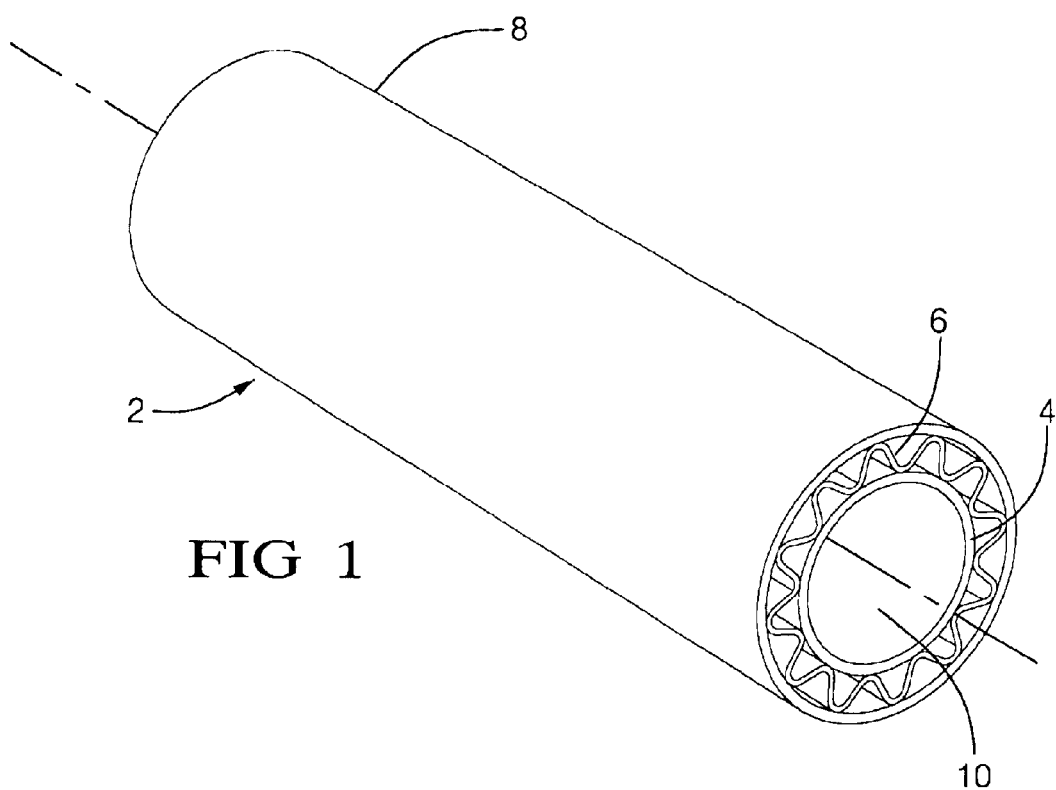
FIGS. 1–15 are views of structural members and methods of making the same according to the present invention.

FIG. 1 illustrates one contoured structural member—a tubular member with a substantially circular cross-section—according to the present invention. In the context of the present invention, a "contoured" structural member is any shape, size, or configuration where at least one portion of the outer or inner periphery of such member is substantially non-flat, including curved, geometric or irregular. Preferably, the contoured structural members have a closed surface configuration, such as a surface which facilitates their manufacture as explained below. In the context of the present invention, a "closed" structural member is one having any shape, size, or configuration where at least one portion of the surface (inner and/or outer) of such member is a substantially closed or substantially continuous. Examples of a closed configuration include a tubular, substantially spherical, polygonal, conical, or other similar shape, as well as those illustrated and described herein.

The structural members of the present invention may have a cylindrical or a non-cylindrical configuration such as cones, pyramid, pods, hemispheres or spheres. The structural members of the present invention may also have a circular or a non-circular cross-section such as rectangular, square, hexagonal, octagonal, or the like. They may also comprise very irregular, non-closed, substantially planar surfaces. Indeed, the structural members of the present invention could have any complex contoured shape or combination of contoured shapes. The structural members of the present invention are characterized by the fact that they are substantially non-flat and thereby distinguished from known sheet-like cored composite structures.

In FIG. 1, tubular structural member 2 comprises inner section or portion 4, intermediate section or portion 6, outer section or portion 8, and optional core region 10. Inner portion 4, outer portion 8, and optional core region 10, can be made of any suitable composite material as described below. Intermediate portion 6 is a "cored" structure that both attaches to and supports and/or stabilizes the inner and outer portions.

Core region 10 is located in an inner section of structural member 2 and, as described below, is about the size of the substrate or mandrel used in forming the structural member. Core region 10 can be of any suitable size, shape, or configuration depending primarily on the removable mandrel(s) in the manufacturing process used to make structural member 2, the configuration of structural member 2, and the desired end application of structural member 2.

Core region 10 may be hollow, but may optionally be partially or completely filled with any desired core material such as foam, plastic, conducting or insulating materials, metals and/or the like. Core region 10 containing the core material may be a structural element. The core material may also be added after structural member 2 is formed, or formed integrally into the structure. If the core material is added after the formation of structural member 2, it may be attached to structural member 2 using an adhesive or other suitable bonding means known in the art.

The materials for inner section 4 and outer section 8 can be the same or different materials. Preferably, inner portion 4 and outer portion 8 comprise the same material. In one aspect of the invention, the materials for the inner or outer portions comprise any suitable reinforced resin matrix material (RRMM), which is a resin matrix material (RMM) with continuous or discontinuous reinforcement material embedded in the resin matrix. In one aspect of the invention, the RMM is a organic resin matrix material (ORMM). See, for example, U.S. Pat. Nos. 5,725,920 and 5,309,620, the disclosures of which are incorporated herein by reference.

In one aspect of the invention, the ORMM can be a thermoset resin. Thermoset resins are polymeric materials which set irreversibly when heated. Examples of thermoset resins include epoxy, bismeleimide, polyester, phenolic, polyimide, melamine, xylene, urethane, phenolic, furan, silicone, vinyl ester, and alkyd resins, or combinations thereof. The thermoset resins can contain various additives as known in the art, such as cross-linking agents, curing agents, fillers, binders, or ultraviolet inhibitors. Preferably, epoxy, vinyl ester, or polyester resins are employed as the thermoset resin in the present invention.

In another aspect of the invention, the ORMM can be a thermoplastic resin matrix material. Thermoplastic resins are polymeric materials which do not set irreversibly when heated, e.g., they soften when exposed to heat and then return to their original condition when cooled. Examples of thermoplastic resins include polypropylene, polyethelene, polyamides (nylons), polyesters (PET, PBT), polyether ketone (PEK), polyether ether ketone(PEEK), polyphenylene sulfide (PPS), polyphenylene oxide (PPO) and its alloys, and polyvinyl resins, or combinations thereof. The thermoplastic resins can contain various additives as known in the art, such as cross-linking agents, curing agents, fillers, binders, or ultraviolet inhibitors. Preferably, polyamides (nylons), polyester, polycarbonate and polypropylene resins are employed as the thermoplastic resin in the present invention.

The material used to reinforce the RMM of the present invention can be in any form which reinforces the resin matrix. Examples of reinforcement forms include unidirectional tape, multidirectional tapes, woven fabrics, roving fabrics, matt fabrics, preforms, fibers, filaments, whiskers, and combinations thereof. The type of material used to reinforce the RMM can be any type serving such a reinforcing function. Preferably, the form of the reinforcement materials for the resin matrix is a fiberous material, such as continuous or discontinuous fibers. Examples of materials that can be employed in the present invention include glass-s, glass-e, aramid, graphite, carbon, ultra-high molecular weight polyethylene, boron, silicon carbide, ceramic, quartz, metals, isotropic metals (aluminum, magnesium and titanium), metal coated organic fibers, CAMP, hybrids of these fibers, or combinations of these fibers. See, for example, U.S. Pat. No. 6,117,534, the disclosure of which is incorporated herein by reference.

In yet another aspect of the invention, non- or partially-cured composite materials are used as the material for the inner and/or outer sections. Composites are a mixture or combination, on a macro scale, of two or more materials that are solid in the finished state, are mutually insoluble, and differ in chemical nature. Any composites known in the art such as laminar, particle, fiber, flake, and filled composites can be employed in the invention. The non- or partially-cured composite materials are a ORMM (thermoset or thermoplastic resin) reinforced with a continuous fiber.

Preferable composite materials used for inner section 4 and outer section 8 include B-stage prepreg materials typically in the form of sheets or laminates, which can be formed by impregnating a plurality of fiber reinforcement tows with a formulated resin. Methods of making B-stage prepreg sheets and the sheets themselves are well known. See, for example, those sheets described in U.S. Pat. No. 4,495,017, the disclosure of which is incorporated herein by reference. When cured, prepreg materials are generally stronger and stiffer than metals while providing greater resistance to fatigue, chemicals, wear and corrosion. Preferable reinforcement for prepregs include aramids, glass materials, nickel carbide, silicone carbide, ceramic, carbons and ultra-high molecular weight polyethylene, or a combination thereof. See, for example, U.S. Pat. Nos. 4,968,545, 5,102,723, 5,499,661, 5,579,609, and 5,725,920, the disclosures of which are incorporated herein by reference. Carbon, glass, metals and especially isotropic metals like aluminum, magnesium and titanium, metal-coated organic fibers, and aramid fibers, or a combination thereof, can also be employed as the fibers. See, for example, U.S. Pat. Nos. 5,601,892 and 5,624,115, the disclosures of which are incorporated herein by reference. Preferably, carbon fibers, glass fibers, or aramid fibers and more preferably Kevlar 29 or 49 fibers are employed in the present invention.

The fiber volume in the prepregs may be varied so as to maximize the mechanical, electrical, and thermal properties. See, for example, U.S. Pat. No. 5,848,767, the disclosure of which is incorporated herein by reference. High fiber volume parts are stiffer and, in the case of thermally conductive fibers, the parts are more thermally conductive. Fiber volumes in the present invention can range from about 5% to about 95%, and preferably range from about 50% to about 65%. The fibers of the prepregs may be oriented within the prepreg material in any desired direction as known in the art, such as about 0 to about 90 degrees, including equal numbers of fibers balanced in opposing directions. See, for example, U.S. Pat. No. 4,946,721, the disclosure of which is incorporated herein by reference.

In yet another aspect of the invention, sheet molding compounds (SMCs) can be used as the materials for the inner or outer portion. SMCs are sheets made up of B-stage thermoset resin reinforced with a discontinuous fiber. SMCs are fully formulated ORMM compounds having discontinuous fiber reinforcement materials which are typically formed into sheet, ply, or laminate—without additional preparation. See, for example, U.S. Pat. No. 6,103,032, the disclosure of which is incorporated herein by reference. The resins that can be used in the SMCs of the present invention include any of the thermoset resins listed above. Preferably, polyester or vinyl esters or epoxy resins are employed as the resin in SMCs of the present invention. The fibers that can be used in the SMCs of the present invention include any of those listed above. Preferably, glass, carbon, or aramid fibers, and more preferably Kevlar 29 or 49 fibers can be used as the fibers in the SMCs. The fiber volume in the SMC may also be varied so as to maximize the mechanical and thermal properties.

With an unsaturated resin system as its base, SMCs incorporate other materials for desirable processing and molding characteristics and optimum physical and mechanical properties, such as mechanical strength, impact resistance, stiffness, and dimensional stability. These incorporated materials include polymers, fibers for reinforcement, resins, fillers, initiators to promote polymerization, viscosity agents, lubricants, mold release agents, catalysts, thickeners, pigments, polyethylene powders, flame retardants, ultraviolet absorbing agents, and other additives. Each of the additives can provide important properties to the SMC, either during the processing or molding steps or in the finished parts, and can be incorporated in the SMCs of the present invention.

Figure 2:
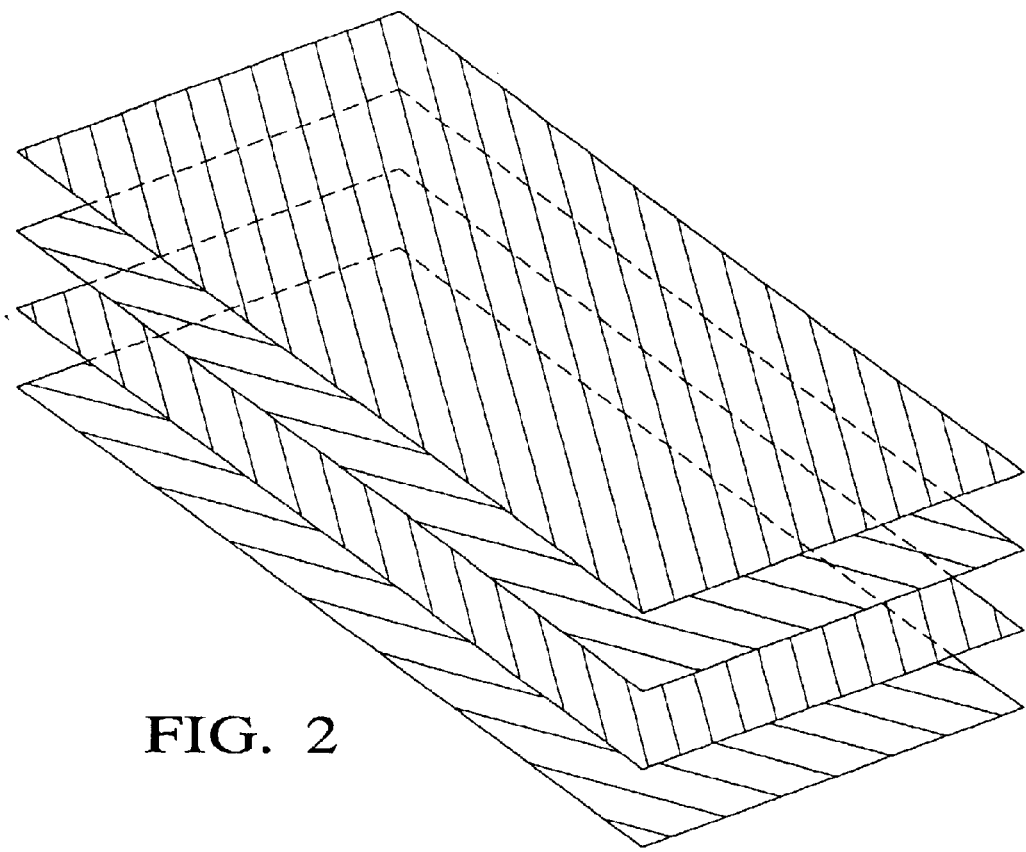

In one aspect of the invention, inner section 4 and outer section 8 contain at least one layer of such ORMM materials. One layer is sufficient to form the respective inner or outer section and provide the desired structural characteristics for structural member 2. Additional layers can be added to improve the strength, stiffness, or other physical characteristics of structural member 2. It is possible to use a single layer with fibers having complementary orientations. It is preferred, however, to use a plurality of layers with complementary orientations to balance intrinsic stresses in the layers that make up the sections that result when, as described below, the B-stage materials are fully cured. To be complementary, the fibers in successive layers should be symmetric and balanced (e.g., by having the fibers offset from the sheet axis by equal and opposite amounts from one layer to another) as shown in FIG. 2. The fibers can also be oriented to meet the design parameters of the component into which they are being incorporated, e.g., to optimize the structural strength against the expected load. The fibers could be oriented at any suitable angle, including at angles ranging from about 0 to about 90 degrees, including in ±15, ±30, ±45, ±60, and ±75 degrees, or as otherwise known in the art. See, for example, U.S. Pat. Nos. Re. 35,081 and 5,061,583, the disclosures of which are incorporated herein by reference.

The configuration of inner portion 4 and outer portion 8 can vary within structural member 2. For example, the materials used for the composite, the fiber orientation, and the curvature, thickness, shape and other characteristics of the inner and/or outer portions (4, 8) can differ along the length and width of structural member 2. See, for example, U.S. Pat. No. 5,718,212, the disclosure of which is incorporated by reference.

Intermediate portion 6 of the structural member 2 of the present invention has any structure which spaces and/or supports inner portion 4 and outer portion 8, as well as enhances the structural properties of those two portions when placed therebetween. Further, intermediate section 6 can be made of any suitable material which separates, supports, stabilizes, couples and attaches inner portion 4 with respect to outer portion 8. Interposing intermediate section 6 between inner section 4 and outer section 8 improves the structural properties according to well-known principles of engineering mechanics and mechanical engineering of structural member 2 over the properties of a member comprising only appropriately shaped inner section 4 and outer section 8 bonded together. Preferably, as illustrated in FIG. 1, the intermediate portion is substantially contiguous with the outer surface of inner section 4 and the inner surface of outer section 8, e.g., the intermediate section 6 contacts the inner section 4 and/or the outer section 8 at discrete points over most—if not all—of their surfaces.

Figure 3:
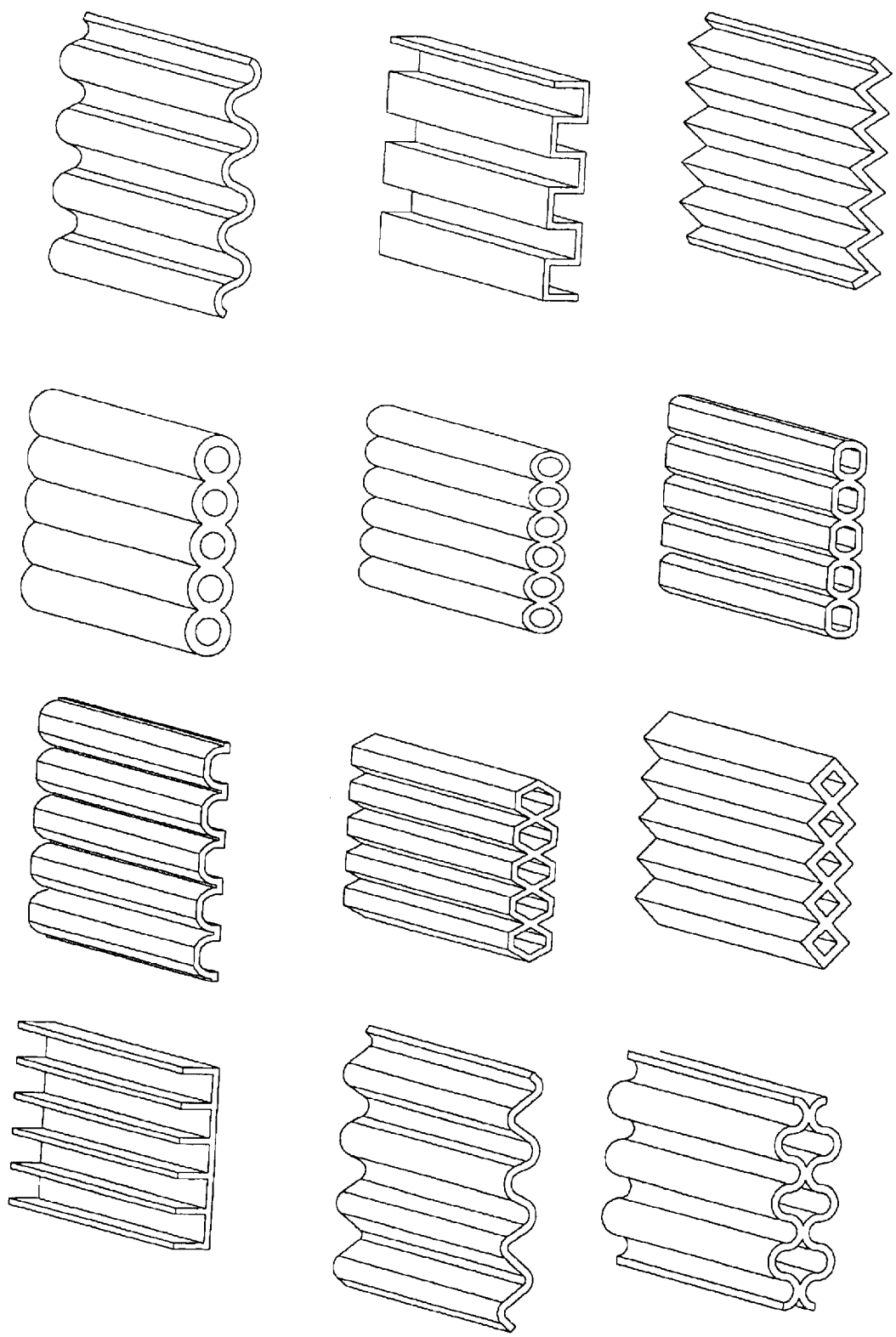

In one aspect of the present invention, intermediate portion 6 has a ribbed structure (RS), or a structure where any single member (rib) of that structure extends continuously from a location proximate the inner (or outer) portion to a location proximate the outer (or inner) portion. In another aspect of the invention, the RS is a structure where any rib connects at one end to a location proximate the at least one layer of the inner (or outer) portion and the other ends abuts or connects to another rib. Examples of RSs include corrugated materials, posts, curvilinear materials, honeycomb cores, and the like. These structures, as well as other RSs, are illustrated in FIG. 3.

A RS is advantageous because, for the additional weight added, the structural properties of the structural member are often substantially increased. The RSs contain both "ribs" and a large volume of voids. The "ribs" of the RS enhance the structural properties of the structural member while the voids are provided to minimize the weight of the RS. The respective amounts of ribs and voids present in the RSs used in the present invention depend on the configuration of the RS selected, e.g., which of those illustrated in FIG. 3 is selected. Preferably, the amount of voids should be maximized and the amount of ribs minimized, thereby giving the minimum weight for the maximum strength, provided the necessary (or desired) structural properties of the RS or the structural member is obtained.

The RSs employed in the present invention can be incorporated into the structural member in any suitable manner. In one aspect of the invention, the RS can be incorporated as a standalone "rib" extending from the at least one layer of the inner portion to the at least one layer of the outer portion, such as the configurations illustrated in FIG. 3. In another aspect of the invention, the rib can be connected to a supporting sheet(s) or another rib(s) where the sheet(s) or other rib(s) itself is connected to the at least one layer of the inner or outer portion.

If desired, additional materials can be incorporated into the ribbed structure. Examples of additional materials that can be incorporated into the RS include be filled with materials other than air, such as resins, foams, insulating materials, or NVH (noise, vibration, or harshness) damping materials, and/or the like.

The RS need not be uniform in the structural member. In one aspect of the embodiment, the type of ribs in the RS can vary from location to location. Further, multiples types of RSs can be combined in the at least one layer of the intermediate portion. In another aspect of the invention, the periodicity and/or thickness of the ribs can be changed in different areas of the at least one layer of the intermediate portion. In another aspect of the invention, the strength and other physical properties of the ribs can change from one location to another.

The ribs of the RS can be made of any suitable material which exhibits the desired structural properties. Suitable materials include any material known in the art to provide such a function, including materials having individual cells like beads, corrugated materials, thermoplastic molded materials, honeycomb materials, woods (balsas), and foams such as rigid expanded plastic foams, polymer foams, metal components, flexible metal (i.e., aluminum) foams, or any combination of these materials. See, for example, U.S. Pat. Nos. 5,344,038, 4,573,707, 5,562,981, 4,128,963, 4,968,545, and 5,894,045, the disclosures of which are incorporated herein by reference.

A preferred intermediate portion 6 may be formed using honeycomb materials (also known as honeycomb cores). These materials usually comprise a thin sheet (or sheets) of material, such as paper or aluminum foil, which is formed into a variety of random or geometric cellular configurations. See U.S. Pat. No. 5,876,654, the disclosure of which is incorporated herein by reference. Honeycomb cores, which have a geometric cellular configuration, are known to have structural properties or characteristics that are superior to most foam or solid cores with a comparable density. Honeycomb cores can be made of various shapes and types of materials such as aluminum, aramid materials such as Korex®, nylon materials such as Nomex®, plastic, reinforced phenols, carbons, and fiberglass, or a combination thereof. Preferably, honeycombs made of Nomex® are employed as the material for intermediate portion 6.

The material and configuration (width, length, and geometric shape) of the cells can be optimized to provide the desired support and/or stabilization to the inner and outer portions. For example, the cell size can range from about ⅛ to about ¾ inches, and is preferably about 3/16 inches.

The cells of the honeycomb cores can be filled with materials other than air, such as resins, foams, insulating materials, or NVH (noise, vibration, or harshness) damping materials, and/or the like. The type of material used, the thickness, the cell configuration, and "fill-in" material for intermediate portion 6 can vary along the length of structural member 2.

The structural member of the present invention may, if desired, have additional layers or portions on the outside of outer portion 8. In one example, a layer of metal, insulation, another composite material, or honeycomb core material may be placed over outer portion 8. Numerous additional portions or layers, including similar or different composite materials, could be added in a similar manner. In addition, at least one structural component, such as a bracket, coupler, cap, or the like could be located on the end(s) of structural member 2.

Figure 4:
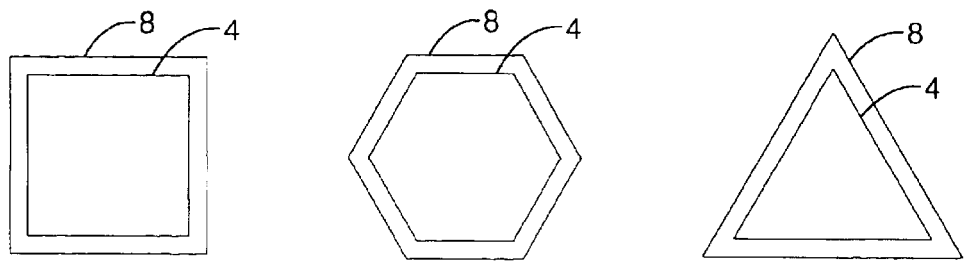

The structural member of the present invention may have any substantially non-flat contour or configuration. FIG. 4 illustrates several such configurations. The structural members illustrated in FIG. 4 differ from the structural member illustrated in FIG. 1 in that the cross-section of the tube is not substantially circular.

Figure 12:
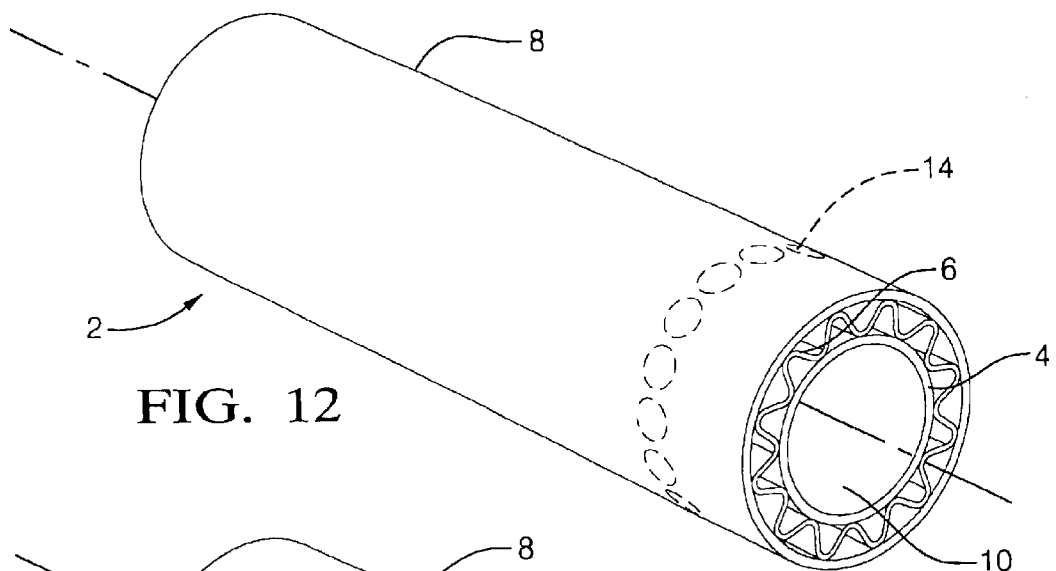

Structural member 2 can be made crushable by any manner in the art. In one aspect of the invention, the structural members are made crushable by including at least one crushing initiator (or initiator) adjacent to (or in) portion 4, portion 6, and/or portion 8. For example, as depicted in FIG. 12, the at least one initiator 14 can be incorporated in outer portion 8. However, the at least one initiator can be incorporated in inner portion 4, intermediate portion 6, and/or outer portion 8, as well as between these portions.

The initiator controls the location where, when an external load is applied, structural member 2 begins to deform. Often, the structural member resists impacts along its longitudinal axis. By including an initiator, the structural member of the present invention absorbs the energy of the load by undergoing a localized crush where the initiator is located, in modes such as transverse shearing, lamina bending, or local buckling like monocell buckling, face wrinkling, or core-shear instability. Thus, the initiator leads to a localized crush of the member so the structural member does not fail at other places. By incorporating at initiator, the preferred site of collapse of the structural member can be selected before the expected load is applied.

Any suitable initiator known in the art can be employed in the present invention, including those described in U.S. Pat. Nos. 4,742,889, 5,732,801, 5,895,699, and 5,914,163, the disclosures of which are incorporated herein by reference. The initiator can be placed at any location of structural member 2 depending on the desired characteristics including the crushing strength and crushing length. Preferably, the initiator is not located at the ends of structural member 2. More preferably, the initiator is placed at least about ½ inch to about 2 inches away from any end of structural member 2.

Multiple initiators can be placed along separate portions of member 2 to deform (and therefore crush) several locations. Multiple initiators can also be placed proximate one another at a single portion of member 2 to deform that selected location. The number of initiators can vary, depending on the desired crushing strength and desired crushing length.

The initiator(s) can be of various shapes, sizes, and configurations, but should be substantially similar to the configuration of portion 4, intermediate portion 6, and/or portion 8. The width of the initiator can vary depending on the expected load, the desired crushing strength, and the desired crush length. For example, the width can range from about 1/16 inches to about 1 inch, and is preferably about ½ inches. The shape of the initiator can also vary depending on the expected load, the desired crushing strength, and the desired crush length. Generally, the shape is similar to that portion of structural member 2 into which it is incorporated. Thus, the shape can vary from circular, to rectangular or triangular, to any polygonal shape.

Figure 13:
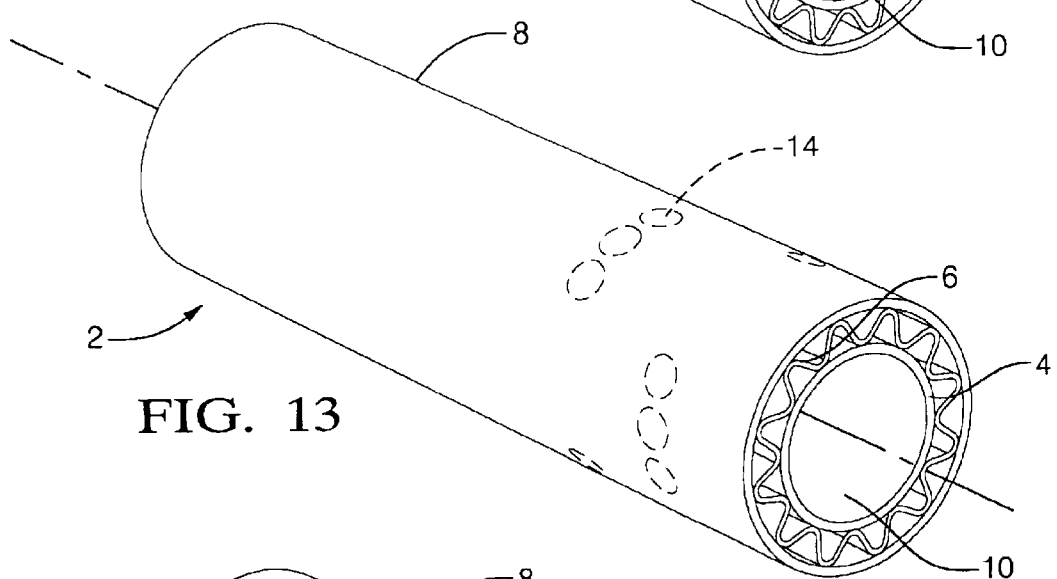
Figure 14:
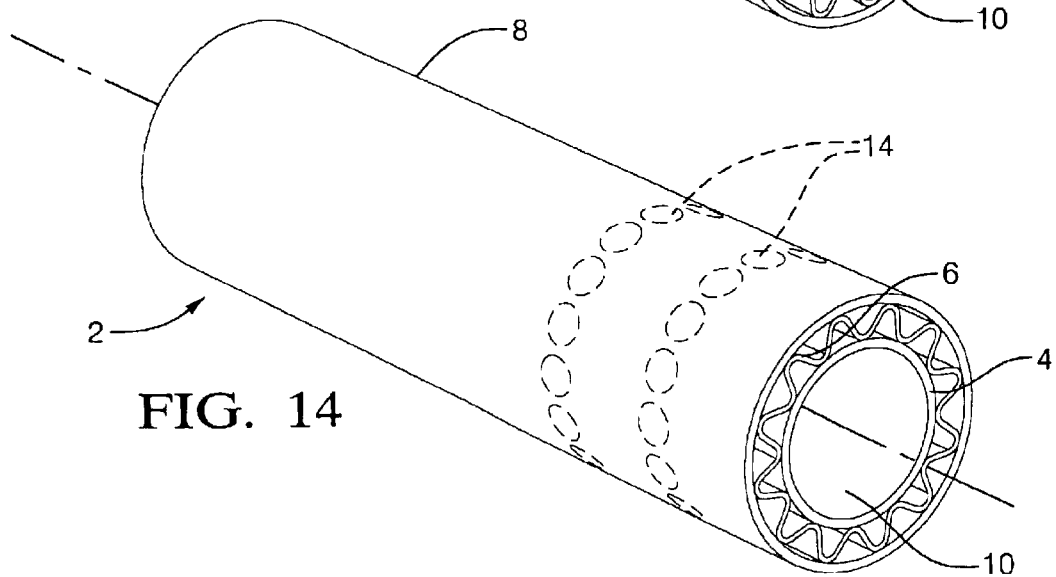

When multiple initiators are employed, they can be located in any desired location. In one aspect of the invention, the initiators can be either staggered or inline. The initiators can be inline, meaning that multiple initiators are aligned along the length or diameter of the structural member. The initiators can also be semi-staggered or fully staggered. In a semi-staggered position, the initiators are only partially aligned along a length or diameter of the structural member, e.g., they have overlapping positions (as illustrated in FIG. 13). In a fully staggered position, the initiators are not aligned along the length or diameter of the structural member, e.g., they have no overlapping positions (as illustrated in FIG. 14).

Any suitable material can be used for the initiator(s) of the present invention. Suitable materials used for the initiator can be any material which causes, as explained below, the respective inner and/or outer portion to deform and do not adhere to the materials used in the inner, intermediate, and/or outer portion. Examples of suitable materials include as teflons, rubber bands, bromated films, release films, rubber films, polytetrafluoroethylene (PTFE) tape, teflons, backing papers, or a combination thereof. In one aspect of the invention, bromated ("bromo") films are preferably employed as the material for the initiator in the present invention.

Bromo films are brominated PTFE coated fiber glass fabric films. Bromo films are usually an impermeable layer that does not bond to the composite material during the curing process (as described below). There are two types of bromo films that can be employed as the initiator material: porous and non-porous. Preferably, a non-porous bromo film is employed as the initiator material, ensuring that there is an unbonded area in any desired location that will cause the failure in that particular location. Numerous bromo films are commercially available, including "Release Ease 234TFP" sold by Air Tech Advanced Materials Group.

Figure 15:
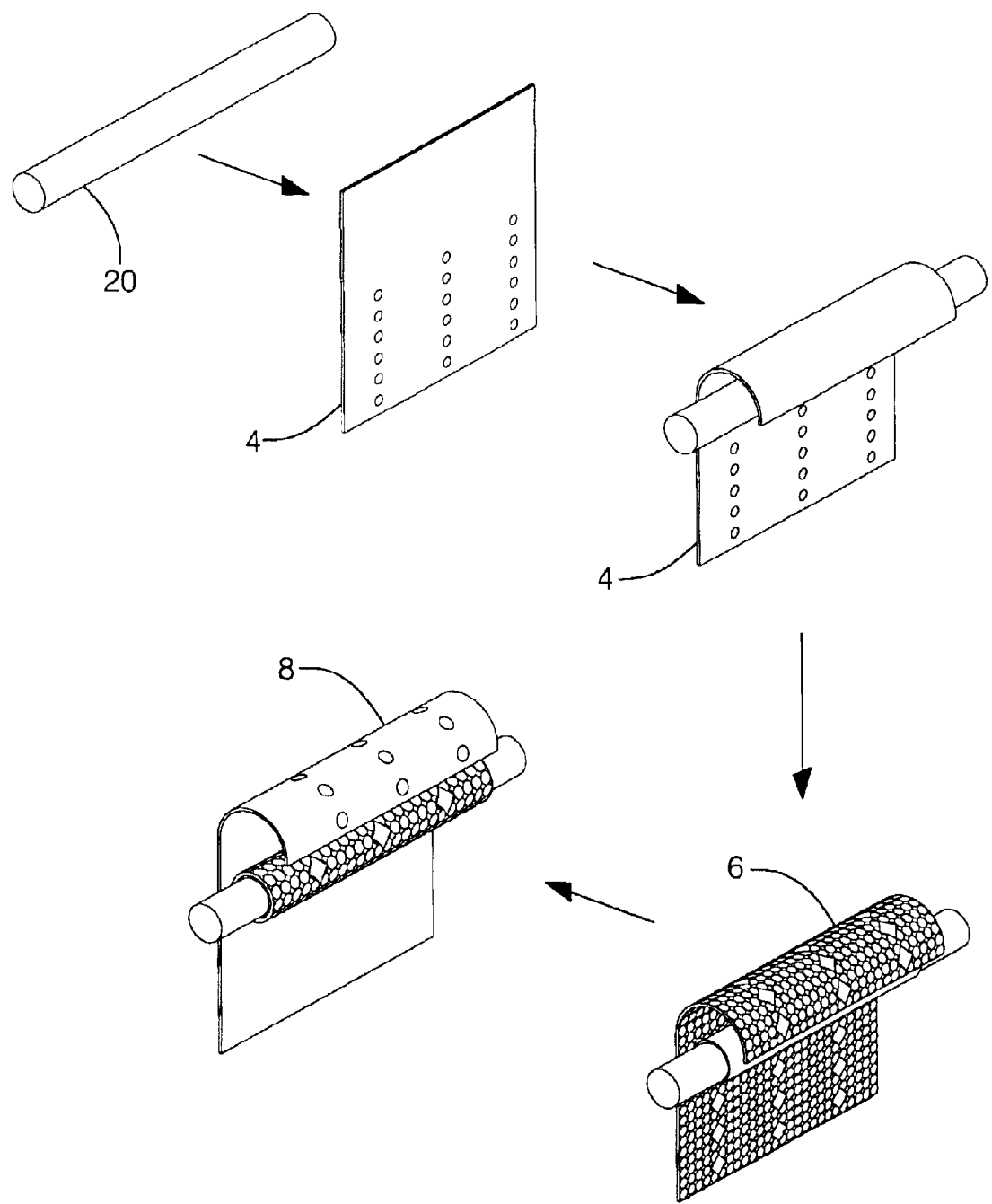

It is believed that the initiator works because of the absence of a continuous layer in the inner, intermediate, and/or outer portion. Thus, the initiator could also be a gap or discontinuity (such as a stress riser) in the layer(s) of the inner, intermediate, and/or outer portion. The discontinuity could be a singular discontinuity such as a fold or irregularity, or plural discontinuities such as a row or column of cut-outs having any desired shape and size. For example, as illustrated in FIG. 15, a row of cut-outs can be located in a layer of the inner and/or outer portion, as well as the intermediate portion, so that when assembled, structural member 2 contains at least one initiator 14. In addition, when the impact load is an axial load, the initiator could be any material (or lack thereof) which operates as a local stress riser.

The present invention can be made by any suitable process which provides the structure of structural member 2. Suitable process for making the composite layer(s) include any processes known in the art, such as thermoforming, bladder or resin transfer molding, or inflatable mandrel processes, as described in U.S. Pat. Nos. 5,225,016, 5,192,384, 5,569,508, 4,365,952, 5,225,016, 5,624,519, 5,567,499, and 5,851,336, the disclosures of which are incorporated herein by reference. Another suitable process is a vacuum bagging process, such as described in U.S. Pat. No. 5,848,767, the disclosure of which is incorporated herein by reference. Other suitable processes are a filament winding process or sheet or tube rolling (also known as roll wrapping). See, for example, U.S. Pat. Nos. 5,632,940, 5,437,450, 4,365,952, 5,624,529, 5,755,558, 4,885,865, 5,332,606, 5,540,877, 5,840,347, and 5,914,163, the disclosures of which are incorporated herein by reference.

In the filament winding process, filaments of the desired material are dispersed in a matrix of binder material and wound about any suitable substrate, such as a mandrel assembly, with a shape generally corresponding to the desired shape (core region 10) of structural member 2. Any suitable mandrel, including those described in U.S. Pat. Nos. 5,795,524, 5,645,668, 5,192,384, 5,780,075, 5,632,940, 5,817,203, and 5,914,163, the disclosures of which are incorporated by reference, can be employed in the present invention. The substrate or mandrel must have sufficient strength, desired shape, and be able to withstand the processing conditions for making the structural member. Suitable mandrels include those made of metals like steel and aluminum, polycarbonate, thermoplastic, or RRMM materials. The mandrels may be solid or hollow.

The filaments are wound over the mandrel and are reciprocally displaced relative to the mandrel along the longitudinal or winding axis of the mandrel to build portion 4. Additional portions, structures, or layers, such as additional metal or composite layers, can be added as described above or as known in the art.

Figure 5:
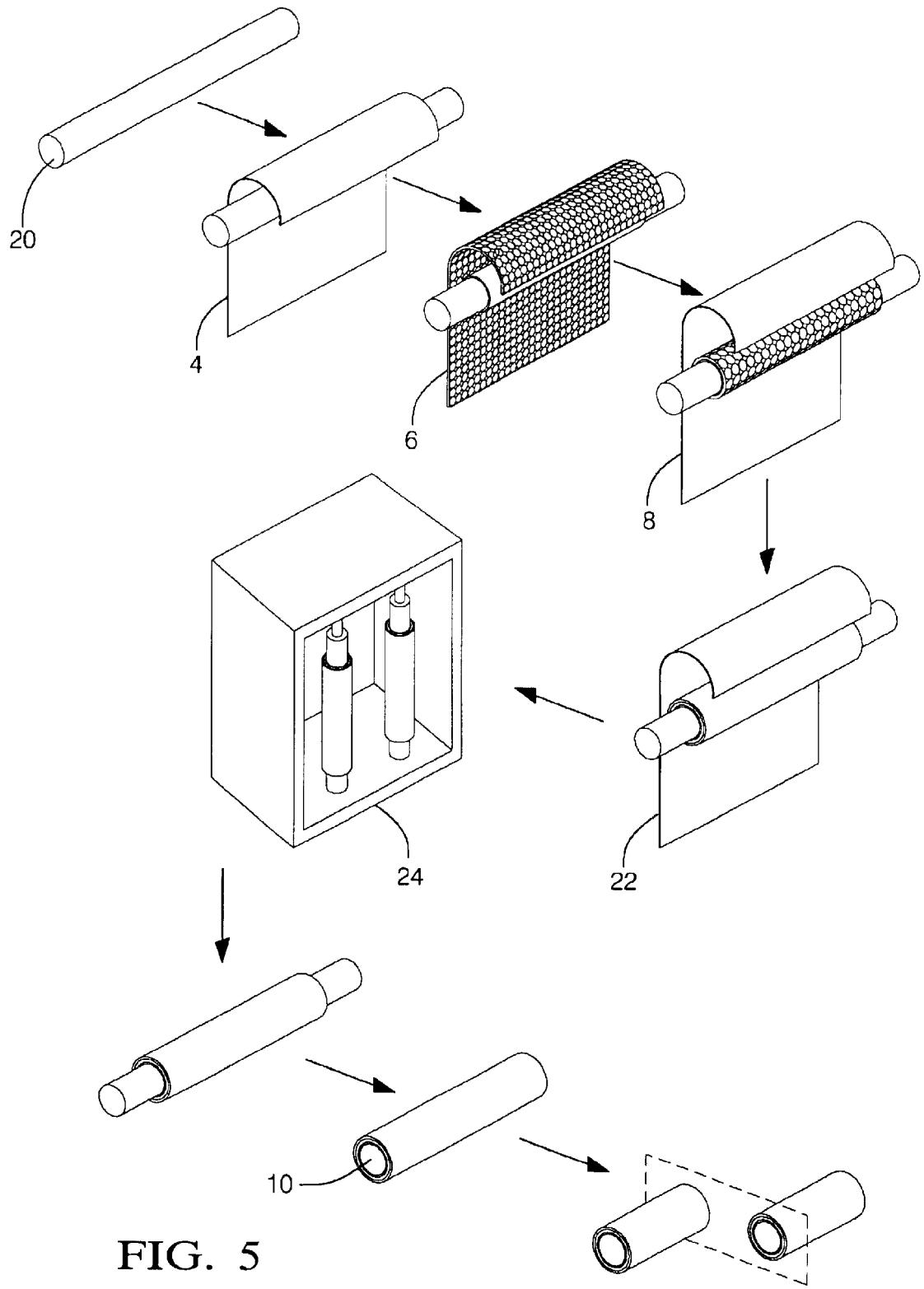

Preferably, the present invention employs a tube rolling (also known as roll wrapping) process for making the structural member of the present invention. One exemplary tube rolling process is illustrated in FIG. 5. The tube rolling process employs discrete sheet(s) (or plies or laminates) of the desired composite material rather than filaments. The sheet(s) is interleaved, wrapped, or rolled over a mandrel assembly such as at least one mandrel 20. If desired, a release film can be applied to the mandrel prior to rolling any materials thereon. When more than one sheet is employed, the sheets can be stacked as illustrated in FIG. 2—prior to or during the rolling process—by hand or by any suitable mechanical apparatus, with the fibers of the composite material oriented in the desired orientation. After forming inner portion 4, the material comprising intermediate portion 6 is placed, preferably by wrapping or rolling, on inner portion 4 by any suitable human or mechanical apparatus. The roll wrapping process is then resumed to apply the material of outer portion 8. Further details about roll wrapping processes are described in *Engineered Materials Handbook, Volume* 1: *Composites*, ASM International, pp. 569–574 (1987), the disclosure of which is incorporated herein by reference. Additional layers or materials can be added over outer portion 8, if desired, in a similar manner or as known in the art.

Figure 6:
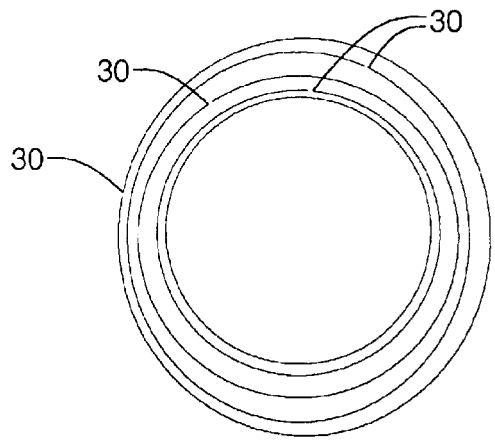

The layers of the individual portions (inner, intermediate, and outer) can be cut and/or patterned such that when roll wrapped, the ends of individual sheet(s) substantially abut when rolled, thereby forming a butt joint 30. Preferably, the butt joint formed by the ends of any single sheet is staggered from the butt joint formed by the ends of an adjacent sheet, as illustrated in FIG. 6.

Inner portion 4 and outer portion 8 may be formed using different methods. For example, inner portion 4 can be formed by filament winding and outer portion 8 by roll wrapping, or vice versa. In this aspect of the invention, inner portion 4 may be fully cured prior to the application of intermediate portion 6. Similarly, inner portion 4 and intermediate portion 6 may be applied and cured together prior to the application of outer portion 8. Other methods known in the art, such as those described above, could also be combined with roll wrapping to make the structural members by performing discrete steps by different methods. For example, inner portion 4 could be formed using the filament winding process, intermediate portion 6 and outer portion 8 could be formed using the roll wrapping process, and then this intermediate structure could be constrained using a vacuum bagging process.

If desired, a bonding agent can be placed between successive layers of portions 4, 6, and/or 8. The bonding agent can be placed on selected areas only, or in a pattern such as in rows and/or columns, or over entire areas of the layer(s)/portion(s). Any suitable agent which helps bond the layers and is compatible with all of the processes employed to make structural member 2 can be employed, including glues, curing agents, adhesive materials, or a combination thereof. See, for example, U.S. Pat. No. 5,635,306, the disclosure of which is incorporated herein by reference. The bonding agent can be applied by hand or mechanical apparatus prior to, during, or after the assembly of the respective portion on the substrate.

Where portions 4, 6, and 8 are successively layed up in an uncured (e.g. B-stage state), the structure has outer portion 8 overlying intermediate portion 6, which overlies inner portion 4, which overlies the mandrel. If necessary to better bond and connect inner portion 4, intermediate portion 6, and outer portion 8 together, the intermediate structure formed by these portions can be constrained. The intermediate structure can be constrained by applying a suitable compressive force. This can be done using any suitable means including compressive dies or molds, vacuum bagging, or by using a suitable constraining means, e.g., by placing it in a plastic or metal mold, or by applying a suitable shrink-wrap tape(s) 22 or tube made of nylon, silicone, or polypropylene. During the curing process described below, the compressive means (e.g., the shrink-wrap tape or tube) applies suitable compressive force by physical or chemical change so that the materials of structural member 2 contact each other. When the RMM is used in the inner and/or outer portion of the present invention, the compressive force squeezes out excess resin during this curing process. See, for example, U.S. Pat. Nos. 5,600,912 and 5,698,055, the disclosures of which are incorporated herein by reference.

Moreover, if it is still necessary to better bond and connect the materials in the intermediate structure, they can undergo a suitable chemical reaction. For example, when inner portion 4 and/or outer portion 8 comprise a curable material (e.g., B-stage epoxy prepreg), the intermediate structure can be cured by any suitable means 24, such as an oven curing by applying heat and/or pressure or using an ultraviolet (u.v.) or microwave curing. The necessary heat and/or pressure depend on the size of the mandrel assembly and the materials used in structural member 2. During the curing process, the shrink-wrap tape or tube applies suitable compressive force. When the RMM is used in the inner and/or outer portion of the present invention, the compressive force squeezes out excess resin during this curing process.

Figure 7:
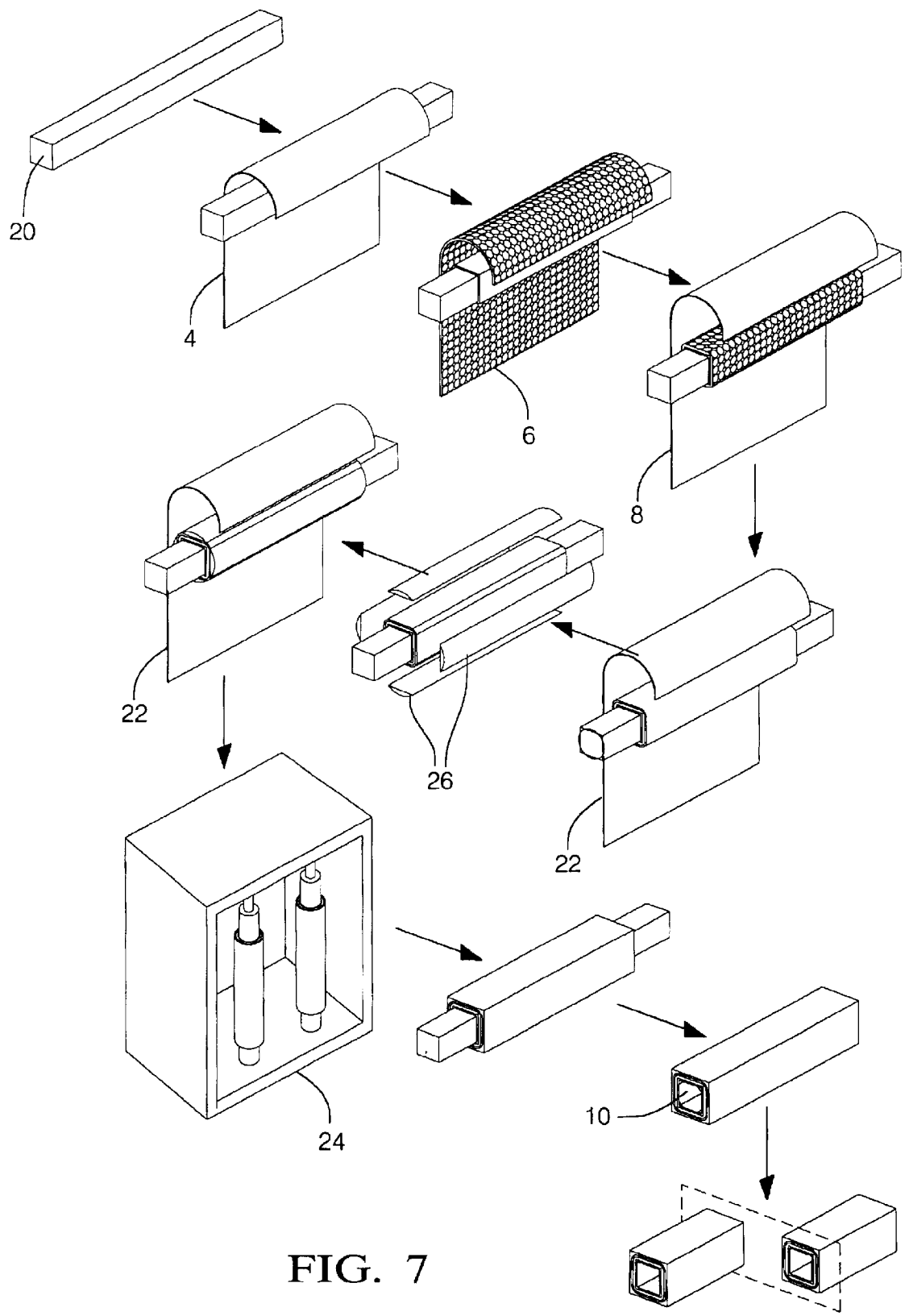

The above process can be modified for structural members not having a substantially circular cross-section, including those with outer diameters having at least one flat area or area where the degree of curvature is substantially different from other surfaces of structural member 2. Examples of such structural members are illustrated in FIG. 4. As illustrated in FIG. 7, where the outer diameter has at least one relatively flat area, the shrink-wrap material (and accompanying compressive force) applied to the intermediate structure may not be uniform. Thus, bonding and connecting the materials to one another may not be uniform and, therefore, might impair the integrity of structural member 2. To more uniformly bond and connect such materials, at least one pressure distributor 26 is placed over the relatively flat areas of outer portion 8 prior to applying the shrink-wrap material. The pressure distributors "distribute" the applied compressive force more evenly to such flat areas, allowing a more uniform compressive force to all areas of the intermediate structure.

Any suitable shape of pressure distributors which evenly distribute the applied compressive force to the intermediate structure can be employed in the present invention. Exemplary shapes of the pressure distributors include substantially semicircular shapes (which provide a substantially circular outer surface) and T-shaped distributors where the flat end of the "T" abuts (and matches in size) the flat area of the intermediate structure and the long-end of the "T" extends outwards. Other shapes and configurations, including single components rather than plural components, could be employed provided they evenly distribute the compressive force over the flat area(s). For the structural member 2 like the one illustrated in FIG. 4, substantially semicircular pressure distributors 26 are depicted in FIG. 7. The pressure distributors of the present invention can be made of any suitable material that will maintain its shape when subjected to the compressive force, such as aluminum, steel, and silicone. Preferably, aluminum is employed as the material for the pressure distributor.

The shrink-wrap material can be placed under and/or over the pressure distributor(s). The shrink-wrap materials underlying the pressure distributors pressurize the corners, as well as keeping the pressure distributors from sticking to the intermediate structure. The shrink-wrap materials overlying the pressure distributors pressurize the flat areas.

Figure 11:
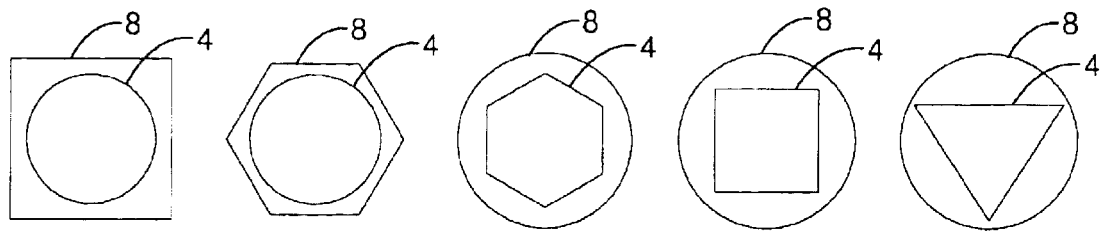

The above process can be also be modified for structural members where the inner and outer portion do not have the same shape, such as those depicted in FIG. 11. Any suitable process modification which manufactures differently-shaped inner and outer portions can be employed in the present invention. The following two modifications to the above process demonstrate this concept. Other modifications could be envisioned, even though not demonstrated below.

Figure 8:
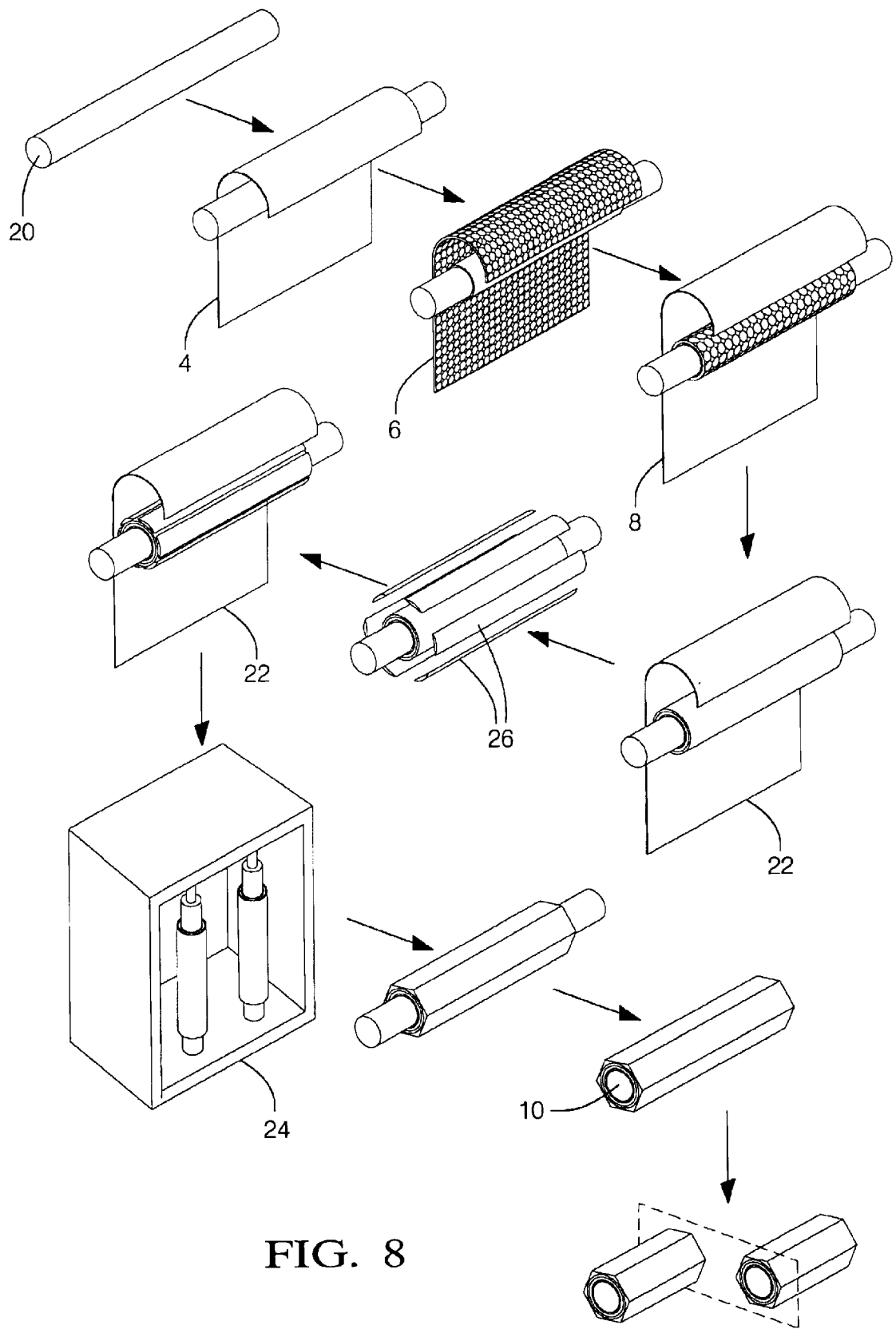

First, the inner portion can have a substantially circular cross-section and the outer portion a non-circular cross-section. In such an instance, and as shown in FIG. 8, the process for making a circular-shaped structural member is followed as described above. To change the shape of the outer portion, a number of pressure distributors are placed over the circular-shaped outer portion prior to the constraining and curing stages. The number of pressure distributors used corresponds to the number of flat sides desired, e.g., four for a square, six for a hexagon, etc . . . The process as noted above is then continued for the constraining and curing stages. During the constraining and curing process, the circular outer shape is changed to flat sides of the desired polygonal shape by the pressure exerted via the pressure distributors.

Figure 9:
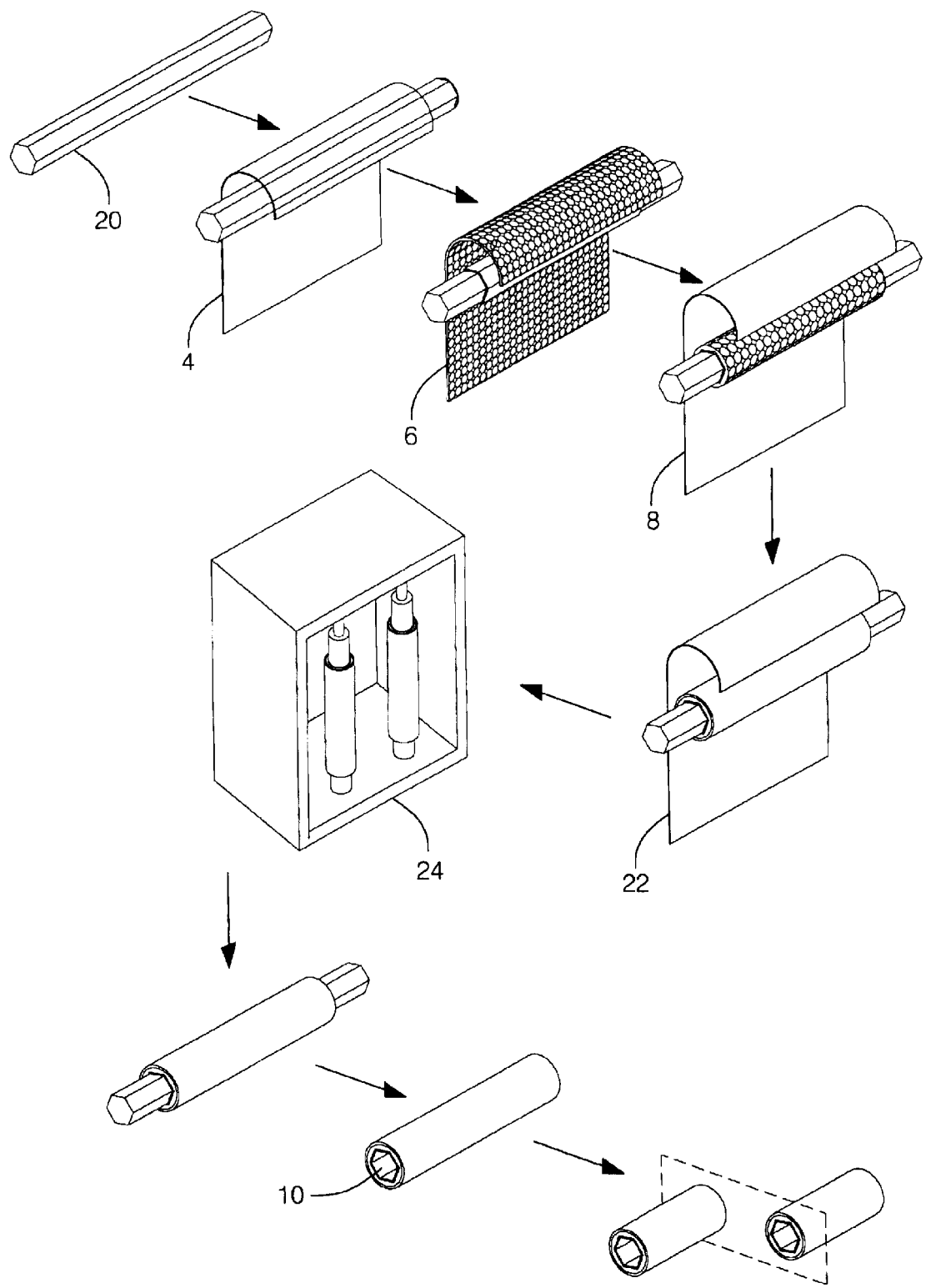

Second, the inner portion can have a substantially polygonal shape (i.e, square) and the outer portion a substantially circular shape. In this aspect of the invention as depicted in FIG. 9, the process for making a square-shaped structural member is followed as described above. To change the shape of the outer portion, the pressure distributors which are normally placed over the outer portion prior to the constraining and curing stages are omitted. Thus, the square-shaped outer portion is just wrapped with the constraining means. The process as noted above is then continued for the constraining and curing stages. During the constraining and curing process, the outer shape is changed to a substantially circular shape by the pressure exerted via the constraining means.

When used, the constraining means are then removed from the intermediate structure. For the plastic or metal mold, the mold is opened and removed. The shrink-wrap tape or tube may have reacted during the curing process to form a thin shell and, if desired, may be removed by hand or by a mechanical apparatus. When used, the pressure distributors are also removed.

In another aspect of the invention, the constraining means can be left on the outer portion either temporarily or permanently. For example, the shrink-wrap tape could be left on the structural member in the form as a thin shell for protection during shipping and then removed later. In another example, the shrink-wrap tape could be left on the structural member permanently as a protective coating.

Through the constraining and curing processes described above, the inner portion and the outer portion are chemically attached and/or or connected to the intermediate portion. Preferably, the materials of the inner and outer portion both chemically bond to the material of the intermediate portion, thus forming a substantially permanent physical bond.

Next, the substrate or mandrel may be removed from structural member 2 to form core region 10. The mandrel may be removed by any suitable process, including any known in the art which safely removes the mandrel without adversely impacting structural member 2, such as those disclosed in U.S. Pat. No. 5,900,194 and 5,306,371, the disclosures of which are incorporated herein by reference. If desired, core region 10 can be filled by any desired material as known in the art.

The mandrel can be either a removable mandrel or an integral mandrel. A removable mandrel is a mandrel that, as described above, is used in the roll wrapping process and then removed to create interior 10. An integral mandrel is a mandrel which becomes part of structural member 2 and is not removed. Thus, the mandrel remains in core region 10 and becomes a part of structural member 2.

When using an integral mandrel, the structural member 2 and the process for making that member are modified from the above description. In this aspect of the present invention, the intermediate portion is provided over the integral mandrel, and then the outer portion is provided over the intermediate portion. The structural member then follows the processing described above, with the exception that the integral mandrel is not removed. Thus, the integral mandrel can serve as the inner portion. If desired, an inner portion could still be included over the integral mandrel, yielding a structural member with an integral mandrel, an inner portion, an intermediate portion, and an outer portion.

At least one initiator 14 may be included in the present invention by any suitable method, including those known in the art. If only one layer is employed for portion 4, intermediate portion 6, and/or portion 8, the initiator can be created under, in, or over that single layer. When more than one layer is employed for such portions, such an initiator(s) can, additionally or alternatively, be included between the layers making up the respective portion.

For example, when the initiator is a gap or discontinuity in portion 4, intermediate portion 6, and/or portion 8, the desired section of that portion can be removed or altered. Any gap or discontinuity is preferably, although not necessarily, formed in the material prior to the roll wrapping operation. The initiator can consist of rows or columns of cutouts of any desired shape and size, as exemplified in FIG. 15, in the respective material which have been removed by any suitable process known in the art, such as stamping. The desired configuration for the initiator is selected, the desired location(s) for deformation of the structural member are determined, and the initiator(s) is then placed by creating a gap or discontinuity in the respective layer(s) of portion 4, portion 6, and/or portion 8 either before or after the rolling operation.

As another example, when the initiator is similar to that illustrated in FIG. 12, the desired width of the initiator material can placed on the selected locations(s) of portion 4, intermediate portion 6, and/or portion 8. The initiator material could be placed by rolling or wrapping the initiator material under or on the respective inner, intermediate, and/or outer portion. Alternatively, the initiator material could be placed in or on the sheet(s) prior to the rolling or wrapping process, e.g., by manufacturing the sheet(s) with the initiator formed therein. The desired material and configuration for the initiator is selected, the desired location(s) for deformation of the structural member are determined, and the initiator(s) is then placed under, over, or within the layer(s) of portion 4, 6, and/or 8 either before or after the rolling operation.

Figure 10:
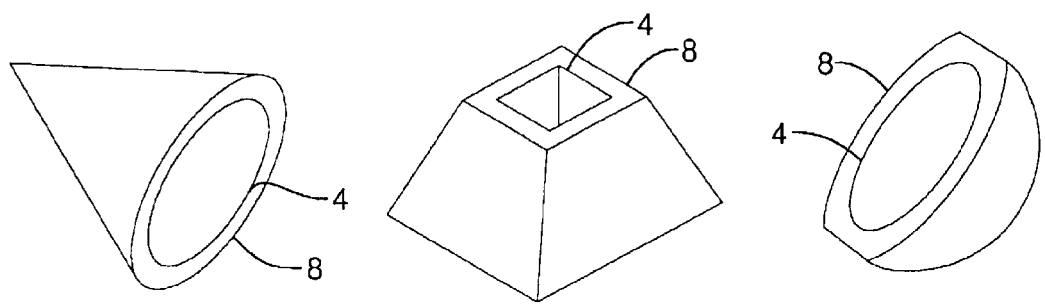

Once formed, the structural members of the present invention can be modified or cut for any desired use. For example, the structural members illustrated in FIGS. 5 and 7–9 have been cut in half along its length to provide two structural members. Likewise, the structural members could be cut along its length to provide any number of members with the desired length(s). Numerous shapes and configurations can be made using by cutting along any dimension of the structural members, especially when combined with the broadest aspects of the processes of the present invention. A few examples of such shapes and configurations are shown in FIG. 10. If desired, at least one structural component such as a bracket, fastener, coupler, cap, or the like, could be provided on structural member 2, for example, on the ends thereof.

Roll wrapping is the preferred method for making the structural members of the present invention. The other methods described above, however, could be combined with roll wrapping to make the structural members by, in one aspect of the invention, performing discrete steps by different methods. For example, inner portion 4 could be formed using the filament winding process, the intermediate portion 6 and the outer portion 8 could be formed using the roll wrapping process, and then the intermediate structure could be constrained using the vacuum bagging process.

The structural member of the present invention has numerous uses such as a tie, torsion-bar, tube, beam, column, cylinder and the like and can be used in numerous industries. Primarily, the structural member can be used whenever a lightweight, strong, cylindrical object is required. The structural member of the present invention can be used in the automotive, transportation, aerospace, and defense industries in applications such as airplane components, vehicle components such as tracks, trains, shipping containers, defense-related applications, recreational applications such as bikes, sail masts, shafts for golf clubs and racquets, or commercial applications such as bridges and buildings.

The following non-limiting examples illustrate the present invention.

EXAMPLE 1

A hollow, cylindrical structural member with a circular cross section was made according to following process. A thin coat of a release material (Frekote 700NC or Axel EM606SL/SP) was applied to a cylindrical aluminum mandrel with a 2.4 inch outer diameter and a length of 48 inches.

Two pair of B-stage prepreg laminate sheets (4 individual sheets) containing anisotropic Kevlar fibers in an epoxy-based resin were cut with measurements of about 9.29 to about 10.8 inches in width and about 44 inches in length.

The first pair of individual laminate sheets (with smaller widths) were then overlaid so the fibers in successive sheets were symmetric and balanced at angles of ±15 degrees. The air between the stacked sheets was removed by using a roller or other suitable device. The pair of the stacked prepreg sheets were then roll wrapped by hand onto the aluminum mandrel.

Then, ½ inch wide strips of a bromo film were measured and cut to a length similar to the outside diameter of the stacked sheets on the mandrel, e.g., 12½ inches in length. The strips of bromo film was then roll wrapped over the prepreg sheets on the mandrel. The strips are located such, that when the structural member is cut as described below, the strips are about 2 inches away from any desired end of the structural member.

Next, a honeycomb Hexcell Nomex® core with hexagonal shaped cells and a thickness of about 0.2 inches was measured and cut to dimensions of about 13 inches by about 44 inches. This honeycomb core was then roll wrapped by hand on the first pair of stacked prepreg sheets and the strips of bromo film.

Other ½ inch wide strips of bromo film were measured and cut to a length similar to the outside diameter of the honeycomb core. These strips then roll wrapped over the honeycomb core to be aligned with the strips under the honeycomb core. The second pair of individual laminate sheets (with larger widths) were then overlaid so the fibers in successive sheets were symmetric and balanced at angles of ±15 degrees. The air between the stacked sheets was removed by using a roller or other suitable device. The second pair of the stacked prepreg sheets were then roll wrapped onto the honeycomb core and strips of bromo film.

Next, the resulting intermediate structure was shrink-wrapped. One layer of polyethylene-based shrink-wrap tape was roll wrapped by a shrink-wrapping machine using gauge number 150 on the resulting structure. Another layer of nylon-based shrink-wrap tape was then roll wrapped by a shrink-wrapping machine using gauge number 200. An additional, outer layer of nylon-based shrink-wrap tape was then roll wrapped by a shrink-wrapping machine using gauge number 200 over the pressure distributors.

After this wrapping process, the final structure was subjected to a curing process at about 250 degrees Fahrenheit for about 120 minutes during which the shrink-wrap tapes applied compressive pressure to the intermediate structure. After this curing process, the outer shell (formed by the outer shrink-wrap tape during the curing process), the pressure distributors, and the inner shell (formed by the "inner" shrink-wrap tapes during the curing process) were removed by hand with a knife. The mandrel was then removed from the center of the tube by hand and the tube was cut to the desired length.

EXAMPLE 2

A hollow, cylindrical structural member with a square-shaped cross section was made according to following process. A thin coat of a release material (Frekote 700NC or Axel EM606SL/SP) was applied to a cylindrical aluminum mandrel with a 3.0 inch square outer diameter and a length of 72 inches.

Four pairs of B-stage prepreg laminate sheets (8 individual sheets) containing anisotropic Kevlar fibers in an epoxy-based resin were cut with measurements of about 11.6 to 13.4 inches in width and about 64 inches in length. The individual laminate sheets were then overlaid so the fibers in successive sheets were symmetric and balanced at angles of ±15 degrees. The air between the stacked sheets was removed by using a roller or other suitable device. Two pairs of the stacked prepreg sheets were then roll wrapped by hand onto the aluminum mandrel.

Then, ½ inch wide strips of bromo film were measured and cut to a length similar to the outside diameter of the stacked sheets on the mandrel, e.g., 12½ inches in length. The strips were then roll wrapped over the prepreg sheets on the mandrel. The strips are located such, that when the structural member is cut as described below, the strips are about 2 inches away from any desired end of the structural member.

Next, a honeycomb Hexcell Nomex® core with hexagonal shaped cells and a thickness of about 0.2 inches was measured and cut to dimensions of about 13 inches by about 64 inches. This honeycomb core was then roll wrapped by hand on the first set of stacked prepreg sheets and strips of bromo film.

Additional ½ inch wide strips of bromo film were measured and cut to a length similar to the outside diameter of the honeycomb core. The strips then roll wrapped over the honeycomb core to be aligned with the strips under the core. The other two pairs of the stacked prepreg sheets were then roll wrapped onto the honeycomb core and the strips of bromo film.

Next, the resulting intermediate structure was shrink-wrapped. One layer of polyethylene-based shrink-wrap tape was roll wrapped by a shrink-wrapping machine using gauge number 150 on the resulting structure. Another layer of nylon-based shrink-wrap tape was then roll wrapped by a shrink-wrapping machine using gauge number 200. Four 4-inch "T"-shaped pressure distributors made of aluminum were placed on the four sides of the resulting device. An additional, outer layer of nylon-based shrink-wrap tape was then roll wrapped by a shrink-wrapping machine using gauge number 200 over the pressure distributors.

After this wrapping process, the final structure was subjected to a curing process at about 250 degrees Fahrenheit for about 120 minutes during which the shrink-wrap tapes applied compressive pressure to the intermediate structure. After this curing process, the outer shell (formed by the outer shrink-wrap tape during the curing process), the pressure distributors, and the inner shell (formed by the "inner" shrink-wrap tapes during the curing process) were removed by hand with a knife. The mandrel was then removed from the center of the tube by hand and the tube was cut to the desired length.

Having described the preferred embodiments of the present invention, it is understood that the invention defined by the appended claims is not to be limited by particular details set forth in the above description, as many apparent variations thereof are possible without departing from the spirit or scope thereof.

I claim:

1. A contoured structural member, comprising:
    at least one contoured inner layer comprising a composite material;
    at least one contoured outer layer comprising a composite material;
    at least one intermediate layer comprising a material with a cellular configuration; and
    at least one initiator.

2. The structural member of claim 1, wherein the structural member has a closed configuration.

3. The structural member of claim 2, further comprising an interior region defined by an inner surface of the at least one inner layer.

4. The structural member of claim 3, wherein the interior region is hollow, partially filled, or completely filled.

5. The structural member of claim 3, wherein the at least one of the composite materials is formed from a prepreg material.

6. The structural member of claim 5, wherein the prepreg material comprises a plurality of layers.

7. The structural member of claim 6, wherein the plurality of layers have a plurality of fibers with an orientation ranging from 0 to about 90 degrees.

8. The structural member of claim 1, wherein the structural member has at least one end with the at least one initiator not located near the at least one end.

9. The structural member of claim 8, wherein the at least one initiator is located from about ½ inch to about 2 inches away from the at least one end.

10. The structural member of claim 1, wherein the cellular configuration of the at least one intermediate layer comprises a ribbed structure connecting the at least one inner layer and the art least one outer layer.

11. The structural member of claim 10, wherein the ribbed structure comprises a honeycomb core material.

12. A contoured structural member, comprising;
at least one contoured inner layer comprising a reinforced resin matrix material;
at least one contoured outer layer comprising a reinforced resin matrix material; and
at least one intermediate layer having a geometric cellular configuration; and
at least one initiator.

13. The structural member of claim 12, wherein the structural member has at least one end with the at least one initiator located from about ½ inch to about 2 inches away from the at least one end.

14. The structural member of claim 13, wherein the at least one intermediate layer has a ribbed structure connecting the at least one inner layer and the art least one outer layer.

15. A contoured structural member, comprising:
at least one contoured inner layer comprising a reinforced resin matrix material;
at least one contoured outer layer comprising a reinforced resin matrix material; and
at least one intermediate layer having a ribbed structure connecting the at least one inner layer and the art least one outer layer; and
at least one initiator.

16. The structural member of claims 15, wherein the structural member has at least one end with the at least one initiator located from about ½ inch to about 2 inches away from the at least one end.

17. A contoured structural member having at least one end, comprising:
at least one contoured inner layer comprising a reinforced resin matrix material;
at least one contoured outer layer comprising a reinforced resin matrix material; and
at least one intermediate layer having a ribbed structure connecting the at least one inner layer and the art least one outer layer; and
at least one initiator located from about ½ inch to about 2 inches away from the at least one end.

18. A contoured structural member, comprising:
at least one contoured inner layer comprising a reinforced resin matrix material;
at least one contoured outer layer comprising a reinforced resin matrix material;
at least one intermediate layer having a honeycomb structure connecting the at least one inner layer and the art least one outer layer; and
at least one initiator.

19. A closed, contoured structural member having at least one end, comprising:
at least one contoured inner layer comprising a reinforced resin matrix material;
at least one contoured outer layer comprising a reinforced resin matrix material;
at least one intermediate layer having a honeycomb structure connecting the at least one inner layer and the art least one outer layer; and
at least one initiator located from about ½ inch to about 2 inches away from the at least one end.

20. A closed, contoured structural member, comprising:
at least one contoured inner layer comprising a reinforced resin matrix material;
at least one contoured outer layer comprising a reinforced resin matrix material;
at least one intermediate layer having a honeycomb structure being substantially contiguous with the at least one inner layer and the art least one outer layer; and
at least one initiator located from about ½ inch to about 2 inches away from the at least one end.

21. A method for making a contoured structural member, comprising:
providing at least one inner layer comprising a composite material;
roll wrapping at least one intermediate layer over the at least one inner layer, the at least one intermediate layer having a cellular configuration;
providing at least one outer layer over the at least one intermediate layer, the at least one outer layer comprising a composite material;
providing at least one initiator; and
connecting the at least one inner and outer layer to the at least one intermediate layer.

22. The method of claim 21, including providing the at least one inner layer by roll wrapping the at least one inner layer over a substrate.

23. The method of claim 22, including providing the at least one outer layer by roll wrapping the at least one outer layer over the at least one intermediate layer.

24. The method of claim 23, further including removing the substrate.

25. The method of claim 24, including partially or completely filling the interior created by removing the substrate.

26. The method of claim 25, further including constraining the at least one outer layer and reacting any reactable material of the at least one inner or outer layers prior to removing the substrate.

27. The method of claim 26, including constraining the at least one outer layer by roll wrapping at least one layer of a shrink-wrap material over the at least one outer layer.

28. The method of claim 27, including removing the at least one layer of the shrink-wrap material after the reaction.

29. The method of claim 27, further including providing at least one pressure distributor over the at least one outer layer.

30. The method of claim 21, the structural member having at least one end and further providing the at east one initiator not located near the at least one end.

31. A method for making a contoured structural member, comprising:
- roll wrapping at least one inner layer comprising a reinforced resin matrix material over a substrate;
- roll wrapping at least one intermediate layer over the at least one inner layer, the at least one intermediate layer having a ribbed structure; and
- roll wrapping at least one outer layer covering the at least one intermediate layer, the at least one outer layer comprising a reinforced resin matrix material;
- providing at least one initiator;
- connecting the at least one inner and outer layer to the at least one intermediate layer; and
- removing the substrate.

32. A method for making a contoured structural member having at least one end, comprising:
- providing at least one inner layer comprising a composite material;
- roll wrapping at least one intermediate layer over the at least one inner layer, the at least one intermediate layer having a cellular configuration;
- providing at least one outer layer over the at least one intermediate layer, the at least one outer layer comprising a composite material;
- providing at least one initiator not located near the at least one end; and
- connecting the at least one inner and outer layer to the at least one intermediate layer.

33. A contoured structural member made by the method comprising:
- providing at least one inner layer comprising a composite material;
- roll wrapping at least one intermediate layer over the at least one inner layer, the at least one intermediate layer having a cellular configuration;
- providing at least one outer layer over the at least one intermediate layer, the at least one outer layer comprising a composite material;
- providing at least one initiator; and
- connecting the at least one inner and outer layer to the at least one intermediate layer.

34. A contoured structural member made by the method comprising:
- roll wrapping at least one inner layer comprising a reinforced resin matrix material over a substrate;
- roll wrapping at least one intermediate layer over the at least one inner layer, the at least one intermediate layer having a ribbed structure; and
- roll wrapping at least one outer layer covering the at least one intermediate layer, the at least one outer layer comprising a reinforced resin matrix material;
- providing at least one initiator;
- connecting the at least one inner and outer layer to the at least one intermediate layer; and
- removing the substrate.

35. A contoured structural member having at least one end made by the method comprising:
- providing at least one inner layer comprising a composite material;
- roll wrapping at least one intermediate layer over the at least one inner layer, the at least one intermediate layer having a cellular configuration;
- providing at least one outer layer over the at least one intermediate layer, the at least one outer layer comprising a composite material;
- providing at least one initiator not located near the at least one end; and
- connecting the at least one inner and outer layer to the at least one intermediate layer.

* * * * *